US007006483B2

(12) United States Patent
Nelson, Jr. et al.

(10) Patent No.: US 7,006,483 B2
(45) Date of Patent: Feb. 28, 2006

(54) QUALIFYING AVAILABLE REVERSE LINK CODING RATES FROM ACCESS CHANNEL POWER SETTING

(75) Inventors: George Rodney Nelson, Jr., Merritt Island, FL (US); James A. Proctor, Jr., Indialantic, FL (US); John E. Hoffmann, Indialantic, FL (US); Antoine J. Rouphael, Escondido, CA (US)

(73) Assignee: IPR Licensing, Inc., Wilmington, DE (US)

( * ) Notice: Subject to any disclaimer, the term of this patent is extended or adjusted under 35 U.S.C. 154(b) by 824 days.

(21) Appl. No.: 09/792,637

(22) Filed: Feb. 23, 2001

(65) Prior Publication Data

US 2002/0159395 A1 Oct. 31, 2002

(51) Int. Cl.
*H04B 7/212* (2006.01)

(52) U.S. Cl. ...................................... 370/342; 370/468

(58) Field of Classification Search ............... 455/63.1, 455/67.11, 68, 69, 507, 517, 525; 370/310, 370/315, 316, 320, 328, 329, 335, 342
See application file for complete search history.

(56) References Cited

U.S. PATENT DOCUMENTS 5,777,990 A 7/1998 Zehavi et al. ............... 370/335

(Continued)

FOREIGN PATENT DOCUMENTS

WO WO 98/43373 10/1998

(Continued)

OTHER PUBLICATIONS

Wang, B., and Chang, P., "Spread Spectrum Multiple-Access with DPSK Modulation and Diversity for Image Transmission over Indoor Radio Multipath Fading Channels", *IEEE*, pp. 200-214 (1996).

*Primary Examiner*—Ricky Ngo
*Assistant Examiner*—Derrick W. Ferris
(74) *Attorney, Agent, or Firm*—Hamilton, Brook, Smith & Reynolds, P.C.

(57) ABSTRACT

Data rate allocation decisions are made for a communications channel, such as a wireless reverse link connection. A first parameter used in this determination is a path loss, which is determined by the following process. First, a message is sent from a first station to a second station, such as on a paging channel. The message indicates a forward Effective Radiated Power (ERP) of a pilot signal transmitted by the first station. The second station then determines the received signal strength of this pilot signal, taking into account receiver gains. The path loss can then be estimated by the second station as the difference between the forward ERP data value that it received and the detected received pilot power. The second station also then preferably determines a transmit power level when transmitting a message back to the first station. This transmit power level information is encoded as a digital data word together with the forward path loss information as calculated by the first station. Upon receipt of these two pieces of information by the first station, the forward path loss estimate as calculated by the second station, and the output power value of the second station, the first station can then determine the amount of excess power available at the field unit. This excess power difference is indicative of the amount of dynamic range available in the transmit power amplifier in the particular second station. With this information, the first station can then make a determination as to whether coding rates which require a higher dynamic range will be acceptable for use by the particular second station.

10 Claims, 8 Drawing Sheets

U.S. PATENT DOCUMENTS

| | | | | |
|---|---|---|---|---|
| 5,825,807 | A | 10/1998 | Kumar | 375/200 |
| 6,400,929 | B1 * | 6/2002 | Ue et al. | 455/69 |
| 6,700,881 | B1 * | 3/2004 | Kong et al. | 370/335 |
| 6,775,548 | B1 * | 8/2004 | Rong et al. | 370/468 |

FOREIGN PATENT DOCUMENTS

| | | |
|---|---|---|
| WO | WO 99/14878 | 3/1999 |
| WO | WO 00/65764 | 11/2000 |

* cited by examiner

ACCESS REQUEST MESSAGE 100

QUALIFYING AVAILABLE REVERSE LINK CODING RATES FROM ACCESS CHANNEL POWER SETTING

FIELD OF THE INVENTION

This invention relates generally to wireless communication systems, and more particularly to a technique for selecting from among several available data rate connections based upon observed conditions in digitally encoded radio channels.

BACKGROUND OF THE INVENTION

The first generation of personal wireless communication devices, such as cellular radio telephones, operated by allocating distinct individual radio carrier frequencies to each user. For example, in an Advanced Mobile Phone Service (AMPS) type cellular mobile telephone, two 30 kiloHertz (kHz) bandwidth channels are allocated to support full duplex audio communication between each subscriber unit and a base station. The signals within each such channel are modulated using analog techniques such as Frequency Modulation (FM).

Later generation systems make use of digital modulation techniques in order to allow multiple users to access the same frequency spectrum at the same time. These techniques ostensibly increase system capacity for a given available radio bandwidth. The technique which has emerged as the most popular within the United States is a type of Code Division Multiple Access (CDMA). With CDMA, each traffic signal is first encoded with the pseudorandom (PN) code sequence at the transmitter. The receivers include equipment to perform a PN decoding function in such a way that signals encoded with different PN code sequences or with different code phases can be separated from one another. Because PN codes in and of themselves do not provide perfect separation of the channels, certain systems have an additional layer of coding referred to as "orthogonal codes" in order to reduce interference between channels.

In order for the PN and orthogonal code properties to operate properly at a receiver, certain other design considerations must be taken into account. For signals traveling in a reverse link direction, that is, from a mobile unit back to a central base station, power levels must be carefully controlled. In particular, the orthogonal properties of the codes are optimized for the situation where individual signals arrive at the receiver with approximately the same power level. If they do not, channel interference increases. It has been possible in the past to set power levels individually to optimize each channel, by for example, adjusting it to affect an optimum received power level at the base station.

Newer generation systems also make use of coding algorithms such as forward error correction (FEC) type algorithms based upon convolutional, Reed-Solomon, or other types of codes. Such FEC codes can be used to increase effective signal-to-noise ratio at the receiver. While such codes do provide increased performance in terms of lower bit error rates in noisy environments, by themselves they do not improve the difficulties associated with co-channel interference. Furthermore, the introduction of the possibility that a given field unit might be using a different FEC coding rate than another unit exacerbates design decisions with respect to prudent power management from the perspective of the system as a whole.

SUMMARY OF THE INVENTION

The present invention is a feature of a wireless data communication system in which the data rates on specific individual traffic channels may be adapted in response to observed channel conditions. For example, the data rate implemented on a particular traffic channel may be selected by changing a Forward Error Correction (FEC) coding rate and/or a selected modulation type depending upon observed conditions in the individual channels.

In a preferred embodiment, the data rate allocation decisions are made for a reverse link connection that carries communications between a first radio station, such as a base station, and a second radio station, such as a field unit. A first parameter that is used in making this determination is a Radio Frequency (RF) path loss. Specifically, path loss may be determined by sending a message from the first station to the second station, such as on a paging channel. The message indicates a forward Effective Radiated Power (ERP) of a pilot signal transmitted by the first station. The second station determines the received signal strength of this pilot signal, taking into account receive antenna gains. The path loss can then be estimated by the second station as the difference between the forward ERP data value that it received and the detected received pilot power.

In a case where the first station is a central base station and the second station is a field unit, the field unit also preferably determines a transmit power level of its local transmit power amplifier when transmitting a bandwidth allocation request message on back to the base station. This transmit power level information is encoded as a digital data word together with the forward path loss information. It is preferably sent in a message sent from the field unit to the base station together with an access request message, such as on a dedicated access channel.

Upon receipt of these two pieces of information, the forward path loss estimate as calculated by the field unit and the existing field unit power amplifier value, the base station can then determine the amount of excess power available at the field unit. This excess power difference is indicative of the amount of dynamic range available in the transmit power amplifier in the particular field unit. With this information, the base station can then make a determination as to whether coding rates which require a higher dynamic range will be acceptable for use by the particular field unit. If, for example, a relatively large amount of excess power margin appears to be available at the field unit, i.e., in situations where the path loss is relatively low and/or the field unit is transmitting at a relatively low power level, a relatively higher rate code and higher rate modulation may be assigned to the particular field unit by the base station.

While the detailed description presented herein is in the context of a wireless communication system controlling the data rates on a reverse link channel, and wherein such that the paging channel and access channel of such a system carry the effective radiated power and estimated path loss information, it should be understood that the invention may be used in other types of wireless communication systems having other channel structures and messaging.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

1. System Architecture and Introduction

Figure 1:
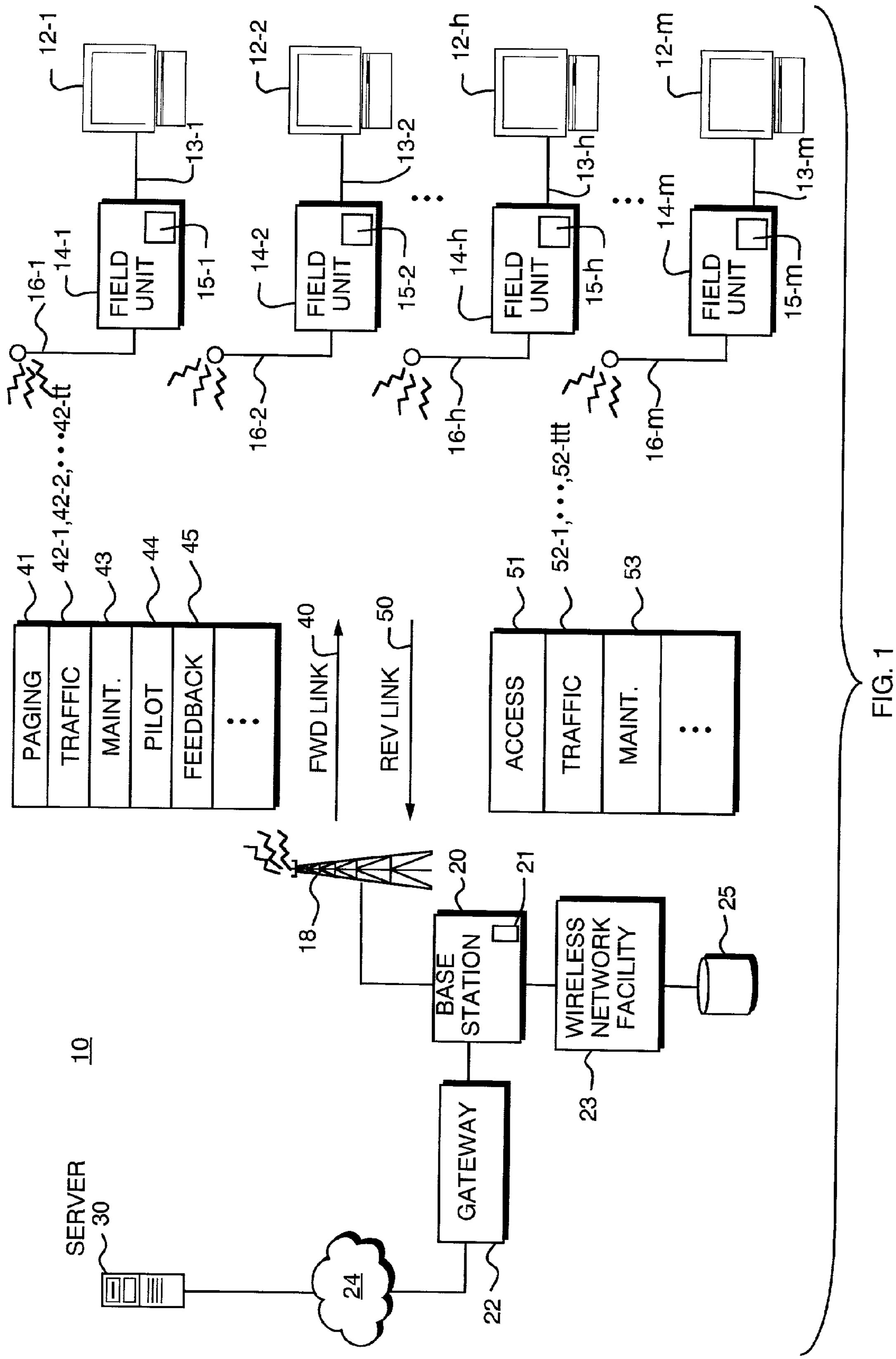
FIG. 1 is a block diagram of a wireless communication system in which the invention may be employed the control data rates depending upon observed channel conditions.

FIG. 1 is a block diagram illustrating a wireless communication system 10 supporting the transmission of data at different rates for particular users, depending upon observed channel conditions for each user. As in many wireless communication systems, users compete for wireless bandwidth allocation. Hence, it is desirable that the wireless communication 10 is optimized for data throughput and, in certain applications, hi-speed bursts of data throughput. Certain aspects of the present invention are based on the recognition that the data rates assigned to a field unit transmitting over a wireless channel can be controlled so that minimally interference with other field units using the same general wireless airspace is created. Specifically, a radio frequency (RF) path loss is determined by broadcasting Effective Radiated Power (ERP) information from a central base station 20. A remote field unit 24 receives this ERP information and also determines a receiver signal strength to compute a path loss. The field unit's power amplifier setting and the result of this path loss calculation are then reported back to the base station. The base station then, in turn, determines a suitable data rate given the channel conditions.

According to the following description, communication system 10 is described as a wireless data system that uses CDMA coding and time division multiplexing to define radio channels. However, it should be noted that the techniques described herein can be applied in other system architectures that support shared access. For example, the principles of the present invention can be applied to other general applications such as telephone connections, computer network connections, cable connections, or other physical media to which allocation of resources such as data channels are granted on an as-needed basis.

As shown, communication system 10 includes a number of Personal Computer (PC) devices 12-1, 12-2, . . . 12-h, . . . 12-m, corresponding field units or terminals 14-1, 14-2, . . . 14-h, . . . 14-m, and associated directional antenna devices 16-1, 16-2, . . . 16-h, . . . 16-m. Centrally located equipment includes a base station antenna 18, and a corresponding base station 20 that includes high speed processing capability. Base station 20 and related infrastructure provides connections to and from a network gateway 22, network 24 such as the Internet, and network file server 30.

Communication system 10 is preferably a demand access, point to multi-point wireless communication system such that the PC devices 12 can transmit data to and receive data from network server 30 based on a logical connection including bi-directional wireless connections implemented over forward links 40 and reverse links 50. That is, in the point to multi-point multiple access wireless communication system 10 as shown, a given base station 20 typically supports communication with a number of different field units 14 in a manner which is similar to a cellular telephone communication network. Accordingly, system 10 can provide a framework for wireless communication where digital information is relayed on-demand between multiple mobile cellular users and a hardwired network 24 such as the Internet. PC devices 12 are typically laptop computers, handheld units, Internet-enabled cellular telephones, Personal Digital Assistant (PDA)-type computers, digital processors or other end user devices, although almost any type of processing device can be used in place of PC devices 12. One or multiple PC devices 12 are each connected to a respective subscriber unit 14 through a suitable hard wired connection such as an Ethernet-type connection via cable 13.

Each field unit 14 permits its associated PC device 12 to access the network file server 30. In the reverse link 50 direction, that is, for data traffic transmitted from the PC 12 towards the server 30, the PC device 12 transmits information to field unit 14 based on, for example, an Internet Protocol (IP) level network packets. The field unit 14 then encapsulates the wired framing, i.e., Ethernet framing, with appropriate wireless framing so that data packets can be transmitted over the wireless link of communication system 10. Based on a selected wireless protocol, the appropriately formatted wireless data packet then travels over one of the radio channels that comprise the reverse link 50 through field unit antenna 16 to base station antenna 18. At the central base station location, the base station 20 then extracts the radio link framed data packets and reformats the packets into an IP format. The packets are then routed through gateway 22 and any number or type of networks 24 to an ultimate destination such as a network file server 30.

In one application, information generated by PC device 12 is based on a TCP/IP protocol. Consequently, a PC device 12 has access to digital information such as web pages available on the Internet. It should be noted that other types of digital information can be transmitted over channels of communication system 10 based on the principles of the present invention.

Data can also be transferred from the network file server 30 to PCs 12 on forward link 40. In this instance, network data such as IP (Internet Protocol) packets originating at file server 30 travel on network 24 through gateway 22 to eventually arrive at base station 20. As previously discussed for reverse link data transmissions, appropriate wireless protocol framing is then added to raw data such as IP packets for communication of the packets over wireless forward link 40. The newly framed packets then travel via an RF signal through base station antenna 18 and field unit antenna 16 to the intended target field unit 14. An appropriate target field unit 14 decodes the wireless packet protocol layer, and forwards the packet or data packets to the intended PC device 12 that performs further processing such as IP layer processing.

A given PC device 12 and file server 30 can therefore be viewed as the end points of a logical connection at the IP level. Once a connection is established between the base station processor 20 and corresponding field unit 14, a user at the PC device 12 can then transmit data to and receive data from file server 30 on an as-needed basis.

The reverse link 50 optimally includes different types of logical and/or physical radio channels such as an access channel 51, multiple traffic channels 52-1, . . . 52-m, and a maintenance channel 53. The reverse link access channel 51 is typically used by the subscriber units 14 to request an allocation of traffic channels by the base station 20. For example, traffic channels 52 can be assigned to users on an as-needed basis. The assigned traffic channels 52 in the reverse link 50 can then carry payload data from field unit 14 to base station 20.

Notably, a given link between base station 20 and field unit 14 can have more than one traffic channel 52 assigned to it at a given instant in time. This enables the transfer of information at higher rates.

The maintenance or "heartbeat" channel 53 can be used to carry maintenance information such as synchronization and power control messages to further support transmission of digital information over both reverse link 50 and forward link 40.

Forward link 40 can include a paging channel 41, which is used by base station 20 to inform a field unit 14 of general information such as that one or multiple forward link traffic channels 42 have been allocated to it for forward link data transmissions. Traffic channels 42-1 . . . 42-n on the forward link 40 are used to carry payload information from base station 20 to a corresponding target subscriber unit 14. Maintenance channel 43 can be used to transmit synchronization and power control information on forward link 40 from base station processor 20 to field units 14. Additionally, a pilot channel 44 can be used to send a reference code signal to the field units for synchronization, as well as to broadcast other information.

Traffic channels 42 of the forward link 40 can be shared among multiple subscriber units 14 based on a Time Division Multiplexing scheme. Specifically, a forward link traffic channel 42 is optionally partitioned into a predetermined number of periodically repeating time slots for transmission of data packets from the base station 20 to multiple subscriber units 14. It should be understood that a given subscriber unit 14 can, at any instant in time, have multiple time slots or no time slots assigned to it for use. In certain applications, an entire time-slotted forward or reverse link traffic channel can also be assigned for use by a particular field unit 14 on a continuous basis.

The field units 14 each contain a data processor 15 that performs a data rate management algorithm as described herein below. A data processor 21 in the base station 20 also participates in these determinations. So, to the extent that the data rate determination algorithm is described below, it should be understood that the processors 15 and 21 are performing the described calculations and tasks.

Radio transceivers in the field units 14 and base station 20 provide access to one or more physical communication links such as the illustrated radio channels 30. The physical links are preferably further encoded using known digital multiplexing techniques such as Code Division Multiple Access (CDMA) to provide multiple traffic on a given radio channel or sub-channels. It should be understood that other wireless communication protocols may also be used to advantage with the invention.

The communications channels may be implemented by providing multiple coded sub-channels on a single wide bandwidth CDMA carrier channel such as having a 1.25 MegaHertz (MHz) bandwidth. The individual channels are then defined by unique CDMA codes. Alternatively, the multiple channels may be provided by single channel physical communication media such as provided by other wireless communication protocols. What is important is that the sub-channels may be adversely effected by significant bit error rates that are unique to each radio channel.

Turning attention now more particularly to the base station 20 and field units 14, they each contain a protocol converter that reformats data from a physical layer protocol such as the CDMA protocol in use with the multi-channel radio transceivers and a network layer protocol such as the TCP/IP protocol providing connections between the computers 12 and the network server 30.

The protocol converters format data to be transmitted over multiple logical sub-channels41, 42, . . . , 45 and 51, 52, . . . , 53*n*. It should be understood in the following discussion that the connections discussed herein are bidirectional, and that a "transmitter" may either be a field unit 14 or the base station 20.

Figure 2:
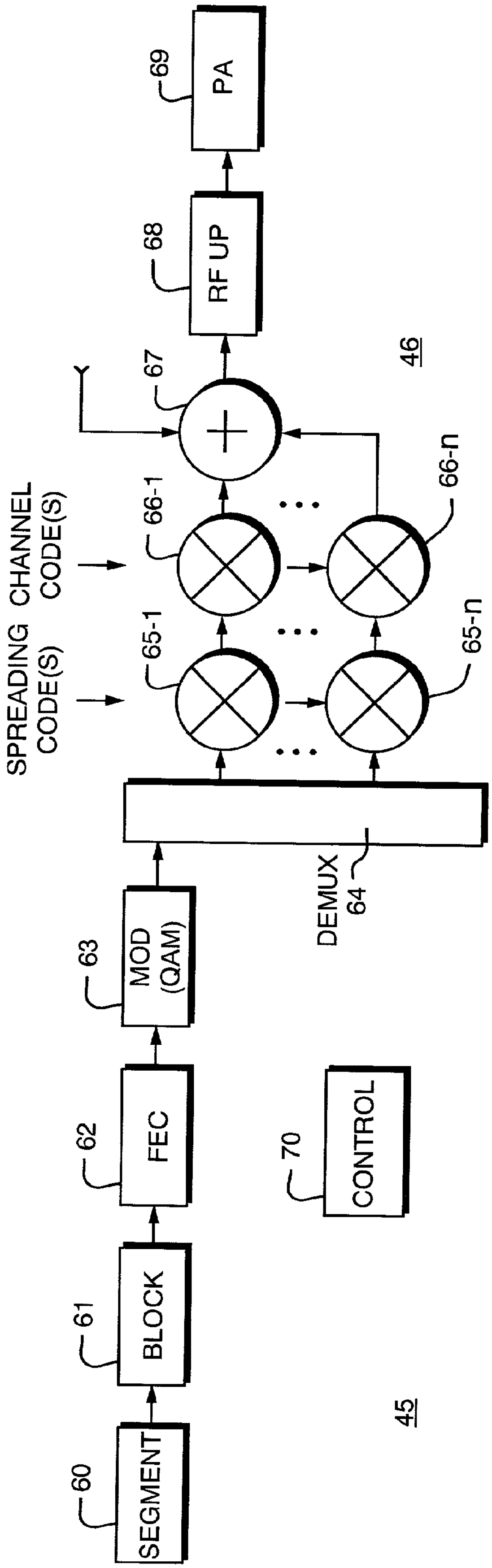
FIG. 2 is a more detailed block diagram of a channel encoder showing how changes in FEC coding rate and modulation type are used to implement different data rates.

FIG. 2 illustrates a more detailed block diagram of a transmitter portion. More particularly, illustrated is the transmitter for the forward link including a protocol converter 45 and multi-channel transceiver 46 associated with the base station 20. The transmitter in the field unit 14 is similar.

As can be seen from the diagram, the protocol converter 45 includes a segmenter 60, block coder 61, Forward Error Correction (FEC) coder 62, and symbol modulator 63. Multi-channel transceiver 46 includes a demultiplexer 64 plus a number of channel modulators including at least one spreading code modulator 65 and channel code modulator 66. It should be understood that there may be a number of spreading code modulators 65-1, . . . 65-n, and a corresponding number of channel code modulators 66-1, . . . 66-n, depending upon the number of CDMA sub-channels 31-1, . . . 31-n, being assigned to a particular forward link connection.

The spreading code modulators 65 preferably apply a pseudonoise (PN) spreading code at a desired chipping rate. The channel code modulators 66 further apply a unique orthogonal or PN code to define each CDMA sub-channel. In the preferred embodiment, the coding rate is 1.2288 Mega-chips per second with 32 chips per input bit. A summer 67 adds the various channel signals together. At this point, additional logical channels such as pilot channels and paging channels may be added to the data channels before all such channels are fed to a Radio Frequency (RF) up converter 68 and power amplifier 69.

The controller 69 provides signals that control the operation of the segmenter 60, block encoder 61, FEC encoder 62, symbol modulator 63, demultiplexer 64, as well as the allocation of spreading code modulators 65 and channel code modulators 66. Specifically, the system may change the number of bits per block, as applied by the block encoder 61, may change the particular rate used for error correction coding as applied by FEC block 62, may change the specific number of bits per symbol, or tier, implemented by the symbol modulator 63, and may change the number of spreading code modulators 65 and channel code modulators 66 allocated to a particular connection. It is the flexibility in assigning these various parameters that provides for a number of degrees of freedom in assigning a data rate for specific connections.

The overall information rate can be represented by the expression shown in FIG. 2. This is the ratio of the chip rate divided by the number of chips per symbol times the number of bits per symbol used in the symbol modulator 63, number of code words per connection as implemented by the number of channel codes implemented by the channel coders 66, and the ratio of the information block size divided by the FEC block size as implemented by the block encoder 61 and FEC encoder 62.

More particularly now with respect to the present invention, certain algorithms are used by the processors 15 and 21 to determine a suitable data rate for a given wireless connection. This data rate is determined from observed conditions in the radio channel, which in turn dictates a range of suitable FEC code rate and modulation type, or tier. As described in the preferred embodiment herein, these algorithms determine a data rate for a reverse link traffic channel that carries data from a subscriber unit 14 towards the base station 20. However, the teachings herein can be applied to forward link channels or other types of communication systems.

In one implementation of the invention, the reverse link 50 handles a random access channel 51, two heartbeat or maintenance channels 53 and a single reverse traffic channel 52. Each user allocated a reverse traffic channel 52 is given a dynamically allocated tier and code rate based on received channel conditions and a reported path loss.

However, in another embodiment, the reverse link 50 handles a random access channel 51, two heartbeat channels 53, and multiple reverse traffic channels 52. Each user allocated a reverse traffic channel 52 is given a dynamically allocated tier and code rate based on received channel conditions and the reported path loss. The algorithm in this instance keeps track of the total traffic power (interference) allocated to determine if another user can be added given his possible code rates and tiers without effecting the existing users.

In another embodiment, the reverse link 50 handles a random access channel 51, two heartbeat channels 53 and multiple reverse traffic channels 52. Each user, allocated a reverse traffic channel is given a dynamically allocated tier and code rate based on received channel conditions and the reported path loss. However, the allocation in this case is made periodically across all reverse link users who have reverse traffic requests. The allocation in this case attempts to find an optimum set of code rates and tiers to maximize total reverse capacity.

2. Field Unit Conditions

In order for the base station 20 to make data rate decisions for the reverse link traffic channels 52, certain field unit operating conditions are determined. First, the path loss between the field unit and the base station is determined. This knowledge is required because the multiple tiers and code rates at each tier require different total receive power at the base station 20 for adequate operation of the Forward Error Correction (FEC) algorithms. In the preferred embodiment, a robust channel structure is selected for the access channel 51, such as Binary Phase Shift Keyed (BPSK), one-half rate coded, modulation tier 2. However, the fact that a user connects to the base successfully using the access channel 51 does not give enough information as to whether or not the user has enough excess power to support higher data rates that might be available for the traffic channel(s) 52, such as a 4/5 FEC code rate at 8-QPSK. The field unit 14 therefore, reports two pieces of information to allow the base station to determine the path loss. These include (a) the forward path loss calculated by the field unit and (b) its existing power amplifier output power. These two values are sent to the base station 20 in the reverse bandwidth request message transmitted on the access channel.

2.1. Forward Path Loss

The forward path loss is calculated by the field unit as an estimate of the forward path loss in [ ] (dB). If the path loss is assumed to be reciprocal and the path loss is known in the forward direction, then it is known in the reverse direction. If the received power is known, then transmit power at the field unit 14 can be calculated given reverse path loss. Calculation of the forward path loss should yield a number between 40 and 150 dB in most operating environments. The integer portion of this loss can therefore be encoded as an 8-bit number representing a loss of between 0 and 255 dB.

The initial power setting for the access channel 51, Field_PA-Pwr, is determined by computing an estimate of this forward path loss between the base 20 and field unit 14 and then using this computed number, along with a value indicating the received access channel signal roster level, RX_Access_Pwr_Desired. This value passed on the paging channel 41 so that the field unit 14 can determine the value of Field_PA_Pwr.

The forward path loss calculation by the field unit 14 is as follows:

$$\text{Fwd\_Path\_Loss}=\text{Fwd\_EIRP}-\text{Field\_}RX\text{\_Pilot\_Pwr}+\text{Field\_}RX\text{\_Ant\_Gain}$$

Where:

Fwd_EIRP is a number in dBm (i.e. 54 dBm) as sent by the base station 20 on the paging channel 41 which represents the forward effective isotropic radiated power (EIRP) of the pilot signal 44.

Field_RX_Pilot_Pwr is a number in dBm (i.e. −85 dBm) as detected from a field unit receiver automatic gain control (AGC) circuit which represents the received signal strength of the strongest pilot 41 path. This number will vary in real time as the pilot channel 44 varies in magnitude.

Field_RX_Ant_Gain is a number in dB (i.e. 6 dB) which represents the gain of the field units 14 receive antenna. This number will most likely be a constant but may vary by field unit configuration.

An initial set point for Field_PA_Pwr is thus calculated as follows:

$$\text{Field\_}PA\text{\_Pwr}=-RX\text{\_Access\_Pwr\_Desired}-\text{Field\_}TX\text{\_Ant\_Gain}+\text{Fwd\_Path\_Loss}+PA\text{\_Step}-\text{Duplex\_Correction}-\text{Offset}$$

Where:

RX_Access_Pwr_Desired is a number in dB ranging from 0 to 63 which represents the desired RX power for the access channel 51 at the base 20 with the base receive antenna gain taken into account. As mentioned above, this number is received over the paging channel 41 and may vary depending on base loading.

Field_TX_Ant_Gain is a number in dB (i.e. 6 dB) which represents the gain of the field units 14 transmit antenna. This number will most likely be a constant but may vary by field unit configuration. Use 6 dB for now.

Fwd_Path_Loss is calculated as described above.

PA_Step is a power step in dB, which is adjusted, based on which access attempt is being transmitted. For the initial attempt the value is set to 0 dB.

Duplex_Correction is a correction factor in dB related to the path loss differences between the transmit (TX) and receive (RX) frequencies. The duplex frequency split is such that the TX frequency is 80 MHz lower than the RX frequency. Since the path loss calculation is made with the RX frequency, the path loss for the transmit path will be less than that for the receive path. Use 0.4 dB as an example difference.

Offset is an offset in dB used to reduce the number of bits used to reflect usable dynamic range. This number is typically empirically determined and set for all deployments. Use 80 dB as a representative value.

2.2. Field Unit Transmit Power

The field unit transmit power is a measure of transmit power used when the channel allocation request message is sent from the field unit to the base station on the access channel 51. This is the variable Field_TX_Pwr outlined above. This number should be encoded as a 6 bit signed number representing the TX power of the field unit between +32 and −31 dBm. The dynamic range of the TX power control on the field unit is greater than 64 dB represented by the 6 bit number, however; the number will be used by the base station to determine excess power at the field unit. The power difference between Tier 3⅓ rate code and Tier 1⅘ rate code is much less than 64 dB.

Figure 3:
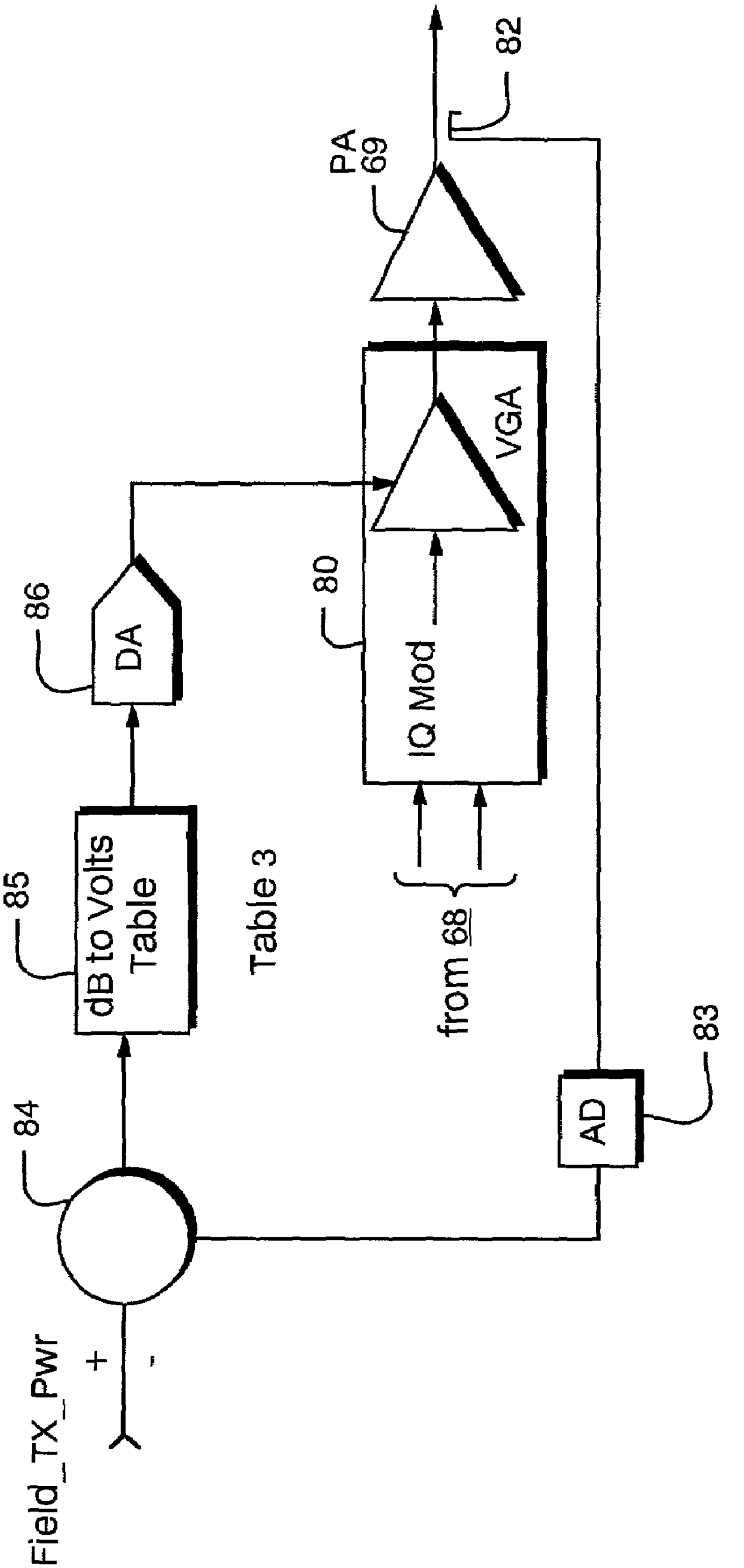
FIG. 3 is a circuit diagram for a field unit, transmit power amplifier (PA) Automatic Gain Control (AGC) circuit.

The field unit 14 transmitter requires gain control to set the output power and to maintain spectral mask requirements. A block diagram of a typical field unit 14 TX AGC circuit is shown in FIG. 3. The circuit includes an output power amplifier 69, which receives the encoded and modulated transmit signal from the tranceiver 46 (FIG. 1) through a Variable Gain Amplifier (VGA) 80. An output power level detector 82 provides an indicator of the field unit output level to an analog to digital (AD) converter 83. This value is combined with the input Field_PA_Pwr value by a comparator 84 to determine a control value to be fed to the VGA 80 through the db to Volts conversion table 85 and digital to analog (DA) converter 86.

The power detector 82 monitors the PA 69 output power level and feeds the result back for correction to the input Field_PA_Pwr value.

The dB to Volts table 85 should must be calibrated to control the PA output power to within +/−1 dB over a dynamic range of −50 to +26 dBm over temperature.

3. Field Unit Bandwidth Access Request

Figure 4:
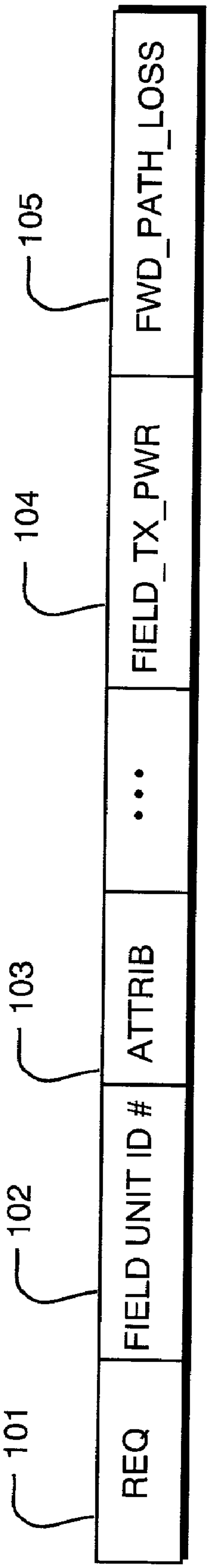
FIG. 4 illustrates the format of an access channel request message that includes field unit transmit power and forward path loss information.

The field unit access request message sent on the access channel 51 includes the forward path loss and field unit transmit power measurements as outlined in Sections 2.1 and 2.2 in addition to what ever else the base station 20 may need to allocate one or more traffic channels to the requesting field unit. FIG. 4 illustrates a format for an access request message 100 sent on the access channel 51. The access request message 100 includes a data field 101, certifying it as an access request, and a data field 12 indicating the identity of the field unit 14 making the request. Other attributes of the request may be included in an attribute field 103. The Field_TX_Pwr 104 value is included in field 104, and the calculated FWD_Path_Loss value in data field 105.

4. Base Station Receive Channel Conditions

Several base station receive channel conditions are also monitored by the reverse channel capacity management algorithm in the processor 21 to determine the code rate and tier a field unit 14 can support. This requires two types of measurements, including measurements that affect all reverse channel users, and measurements that are user specific. The only measurement that affects all users is the total received power as measured by a base station AGC circuit. RMS Delay Spread, received power per user, and Es/Nt are three user specific measurements which are maintained for each user who may request reverse traffic channels. Each of these measurements is described below in greater detail.

4.1. Total Receive Power

One way to estimate reverse link signal to interference ratio (SIR) is to use total received power. Measurement of received power at the base station is passed to the data rate management algorithm at least once per epoch.

Figure 5:
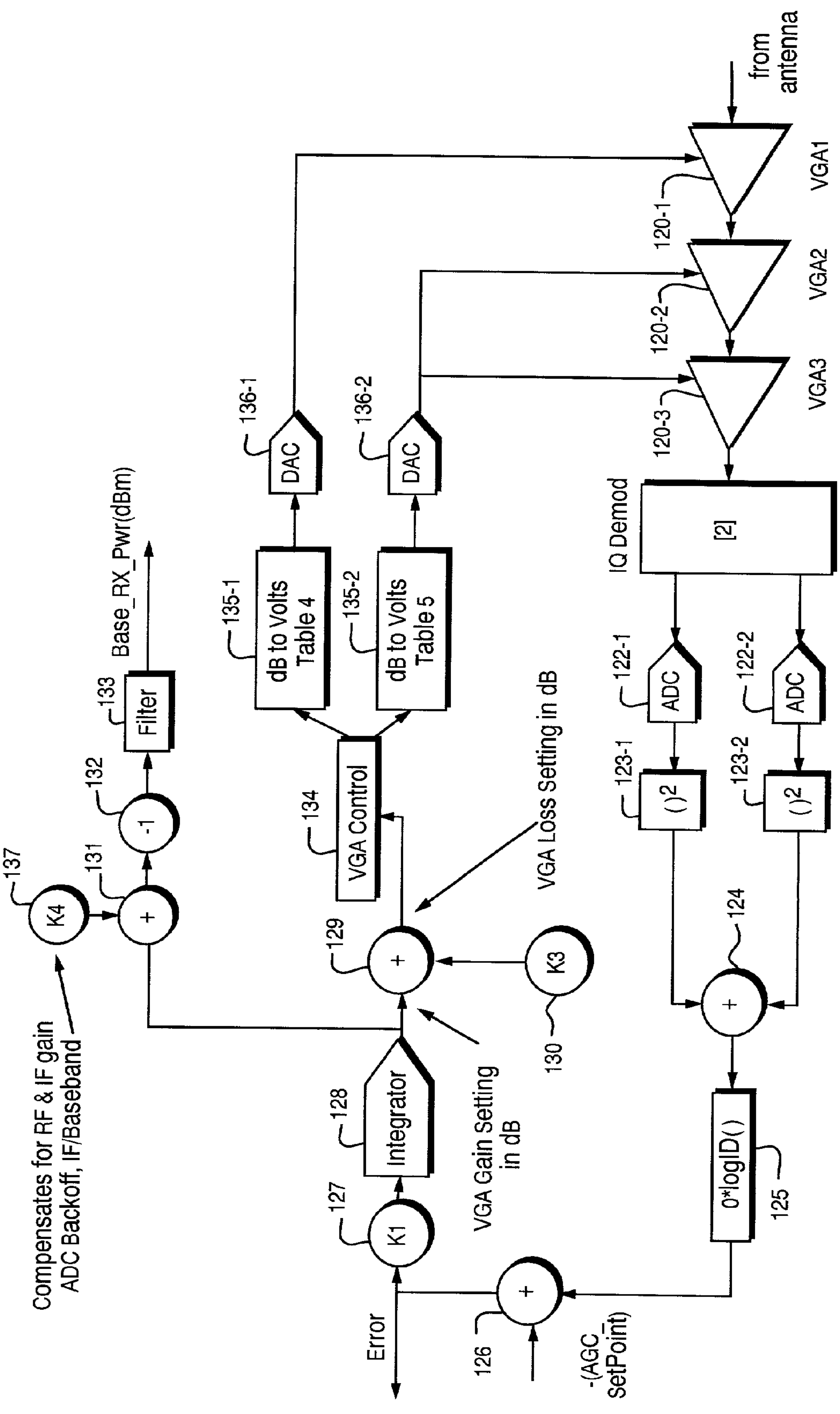
FIG. 5 is a diagram for a base station receiver AGC circuit.

A base station 20 RX AGC algorithm controls the VGAs in the base station to maintain a specified headroom and present total received power. Such a RX AGC circuit for the base station 20 is shown in FIG. 5. It includes three VGAs 120-1, 120-2, 120-3, an I/Q demodulator 121, analog to digital converters 122, magnitude circuits 123, adder 124, log amp 125, set point adjustment comparator 126, gain block 127, and integrator 128. Measurement of the value Base_RX_Pwr parameter is accomplished by computing the sum of the magnitude squared of the I channel and Q channel (after modulation by QAM block 63 in FIG. 2, the transmitted signal have both an in-phase (I) and quadrature (Q) component. Blocks 121, 122, 123, and 124 accomplish this function. The result is converted to dB by the log amp 125 and compared to a threshold by comparator 126 to set the headroom in the converters. If the math is such that full scale on the converters is presented by a +1, then the set point is a negative number in dB, which represents the RMS power at the output of the converters. AGC_SetPoint should be set to 12 dB.

The error from the set point comparison is scaled by K1 127 and then integrated 128. K1 should be set between 0.1 and 0.5. The output of the integrator 128 contains the gain required by the VGAs 120 to set the RMS output at the output of the converters 122 to within 12 dB of full scale. The actual VGA 120 have both gain and attenuation, so K3 130 is used to shift the gain down to a bipolar number (+/− gain).

VGA Control 134 is used to distribute the required attenuation (loss) across the three variable gain amplifiers 120. The first 15 dB of attenuation required by the loop should be provided by VGA1 120-1. The cascade of VGA2 120-2 and VGA3 120-3 should provide the next 30 dB of attenuation required by the loop. The remaining attenuation should be provided by VGA1 120-1. This eliminates an output compression issue with the VGAs 120. The dB to volts tables 135 map dB of attenuation to volts required to drive the VGAs 120. The VGAs 120 are preferably linear—linear control and not log—linear control.

The total VGA gain is adjusted by K4 134 to produce the total desired gain. K4 presents the gain between the antenna and VGA input plus the AGC headroom (12 dB) and a 3 dB correction factor (−3 dB) to compensate for the power measurement at baseband and the real RF power. The last factor is necessary because the RMS computation is done at complex baseband where the crest factor is 3 dB less than that at IF or RF. After the correction by K4 total gain is negated to get the total RX power in dBm. This result is then filtered and becomes the Base_RX_Pwr value in subsequent calculations.

4.2. RMS Delay Spread

The RMS Delay Spread value is a measurement of the relative strength of the multi-path present on the reverse link for each field unit 14. The preferred manner of taking this measurement is outlined below in section 4.5.3. The result of this measurement is a 5-bit number, which represents the pilot multi-path delay spread in ¼ chip increments (0 to 8 chips). This measurement is made for both the heartbeat (maintenance) 53 and traffic channels 52 for each in-session user. This measurement is passed to the data rate management algorithm at least once per epoch during traffic and once each heartbeat received.

4.3. Received Channel Power

The received channel power value is a measurement of the received power for a single user. This measurement is outlined below in Section 4.5.1. This measurement is made for both the heartbeat (RX_HrtBt_Pwr_Measured) and traffic channels 52 (RX_Trffc_Pwr_Measured). This measurement is passed to the capacity management algorithm at least once per epoch during traffic and once each heartbeat received.

4.4. Es/Nt

Es/Nt is a measurement of the energy per symbol to total noise density of each user on the reverse link. This measurement is made only on the heartbeat channels 53 to estimate the channel quality. This measurement is required in order to estimate the interference present on the channel 53 given time alignment. Monitoring the power per channel and the total power allows computation of the signal to interference ratio (SIR) given no time alignment. However, with time alignment some amount of orthogonality will be gained on each channel, which needs to be taken advantage of by the capacity management algorithm. Measurement of the heartbeat Es/Nt allows measurement of Nt which is the interference power of all other existing users of the reverse link with respect to the measured user. The measurement is outlined below in Section 4.5.4. This measurement is passed to the capacity management algorithm each heartbeat period.

4.5 Determining Base Station Parameters

The following describes the processing which is performed on the heartbeat channels (maintenance) 53 channels transmitted by the field unit 14.

4.5.1 Base Power Measurement The heartbeat channel 53 demodulators (diversity paths) compute the heartbeat channel power and time offset by monitoring the power of the three strongest paths and timing of the single strongest path present in a rake receiver pilot correlation filters (PCF) on a time alignment signal or receiver "string". At the end of a slot time when the detection is up loaded to the controller the average heartbeat power is also passed up. The average receive heartbeat channel power may be computed as shown in FIG. 6.

A PCF peak value is fed from each of three Pilot Correction Filters (PCFs) (not shown) and summed by adder 150. After scaling 151 and conversion to a log scale 152 for dB, a PCF_Hr+Bt_Pwr value indicates a received heartbeat power level. This value may be adjusted by a Base_RX_Pwr value and AGC_Setpoint to arrive at the RX_Heartbeat_Pwr_Measured value in dB.

4.5.2 Link Quality Metric

Figure 6:
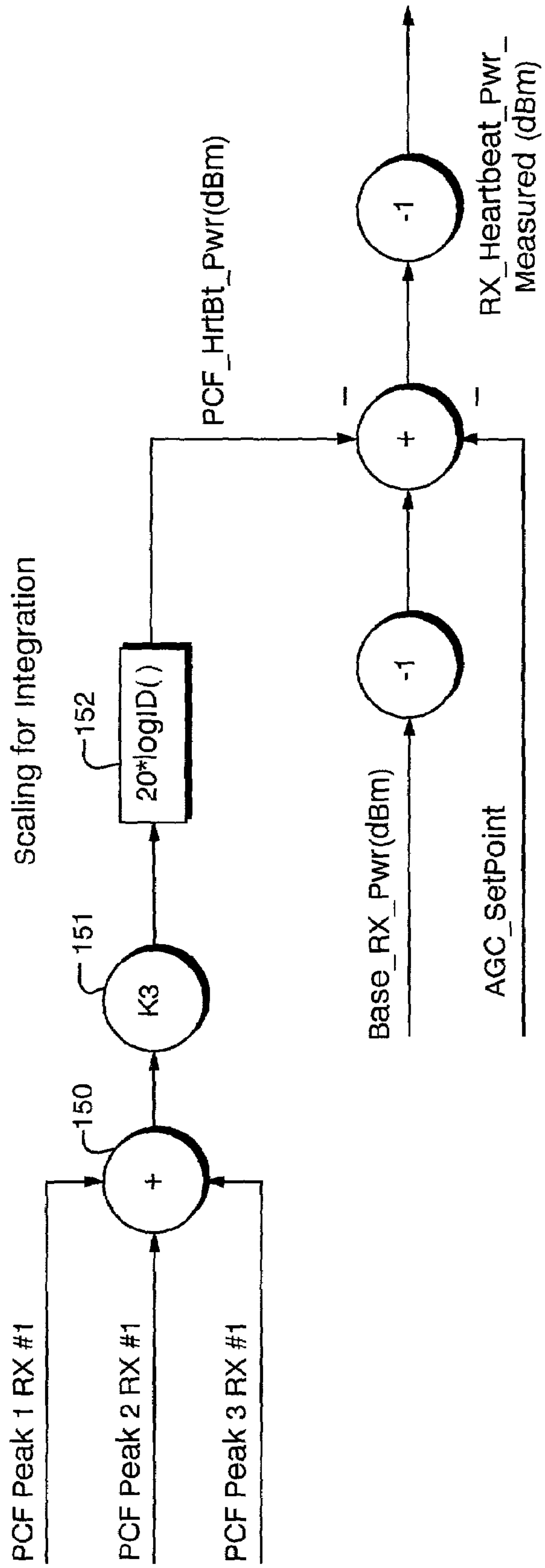
FIG. 6 is a diagram illustrating heartbeat channel power calculations.

The RX_HrtBt_Pwr_Measured value as output by the power measurement circuit of FIG. 6 is then manipulated by RX_Ant_Gain and Offset values to form a LQM_Metric value which is sent in the LQM slot for this heartbeat slot if a heartbeat is detected. If the heartbeat signal is not detected the LQM_Metric is forced down by 1 dB and sent in the LQM slot for this heartbeat slot. The last case covers a condition where a field unit 14 is assigned a heartbeat slot and is not being detected (or the user is requesting to go active). If this condition happens consistently across multiple then a new Reverse Traffic Allocation Message as should be sent to adjust the heartbeat power set point in the field unit up.

A Link Quality Metric value LQM_Metric is calculated by the data rate determination algorithm in the processor 21 as follows:

$$LQM\_\text{Metric}=\text{int}(\text{abs}(RX\_\text{HrtBt\_Pwr\_Measured}-RX\_\text{Ant\_Gain}+\text{Offset}))$$

Where:

RX_HrtBt_Pwr_Measured is a number in dBm (i.e. −116 dBm) measured by the base station per the circuit in FIG. 6.

RX_Ant_Gain is a number in dBi (i.e. 17.5 dBi) indicating the base station receive antenna gain. It may vary by base station 20 and/or by sector. This number will be determined at the time the base station 20 is brought on line and will remain fixed from that point.

Offset is an offset in dB used to reduce the number of bits used to reflect usable dynamic range. This number will be empirically determined and set for all deployments. Use 80 dB typically.

4.5.3 Base RMS Delay Spread Measurement

The base station measures the RMS delay spread of the heartbeat channel 53 and passes this information to the reverse data rate management algorithm. The algorithm uses the RMS delay spread to help determine the code rate and tier that can be supported.

The RMS delay spread for the heartbeat is computed from the path profile according to the following equations.

$$MS=\frac{((PI_1^2+PQ_1^2)\cdot k_1)+((PI_2^2+PQ_2^2)\cdot k_2)+((PI_3^2+PQ_3^2)\cdot k_3)}{(PI_1^2+PQ_1^2)+(PI_2^2+PQ_2^2)+(PI_3^2+PQ_3^2)} \qquad \text{Equation 1.}$$

Mean Delay Spread $$RMSSpread=\sqrt{\frac{(k_1-MS)^2\cdot(PI_1^2+PQ_1^2)+(k_2-MS)^2\cdot(PI_2^2+PQ_2^2)+(k_3-MS)^2\cdot(PI_3^2+PQ_3^2)}{(PI_1^2+PQ_1^2)+(PI_2^2+PQ_2^2)+(PI_3^2+PQ_3^2)}} \qquad \text{Equation 2.}$$

RMS Delay Spread

Where $PI_x$ and $PQ_x$ is I and Q of the $x^{th}$ path, $k_x$ is the ¼ sample position of the $x^{th}$ path. For example; k1 may be 0, k2 may be 13 and k3 may be 42. For the base station measurements this calculation will yield the RMS delay spread in ¼ chip increments. This calculation should be performed on the demodulators running on the time alignment string in the base station 20. This number is preferably made available to the reverse capacity management once per heartbeat.

4.5.4 Base Es/Nt Measurement

This measurement is made only on the heartbeat channels 53 to estimate the channel quality. This measurement is required in order to estimate the interference present on the channel given time alignment. Monitoring the power per channel and the total power allows computation of the signal to interference ratio (SIR) given no time alignment. However, with time alignment some amount of orthogonality will be gained on each channel, which needs to be taken advantage of by the capacity management algorithm. Measurement of the heartbeat Es/Nt allows measurement of Nt, which is the interference power of all other existing users of the reverse link with respect to the measured user.

Figure 7:
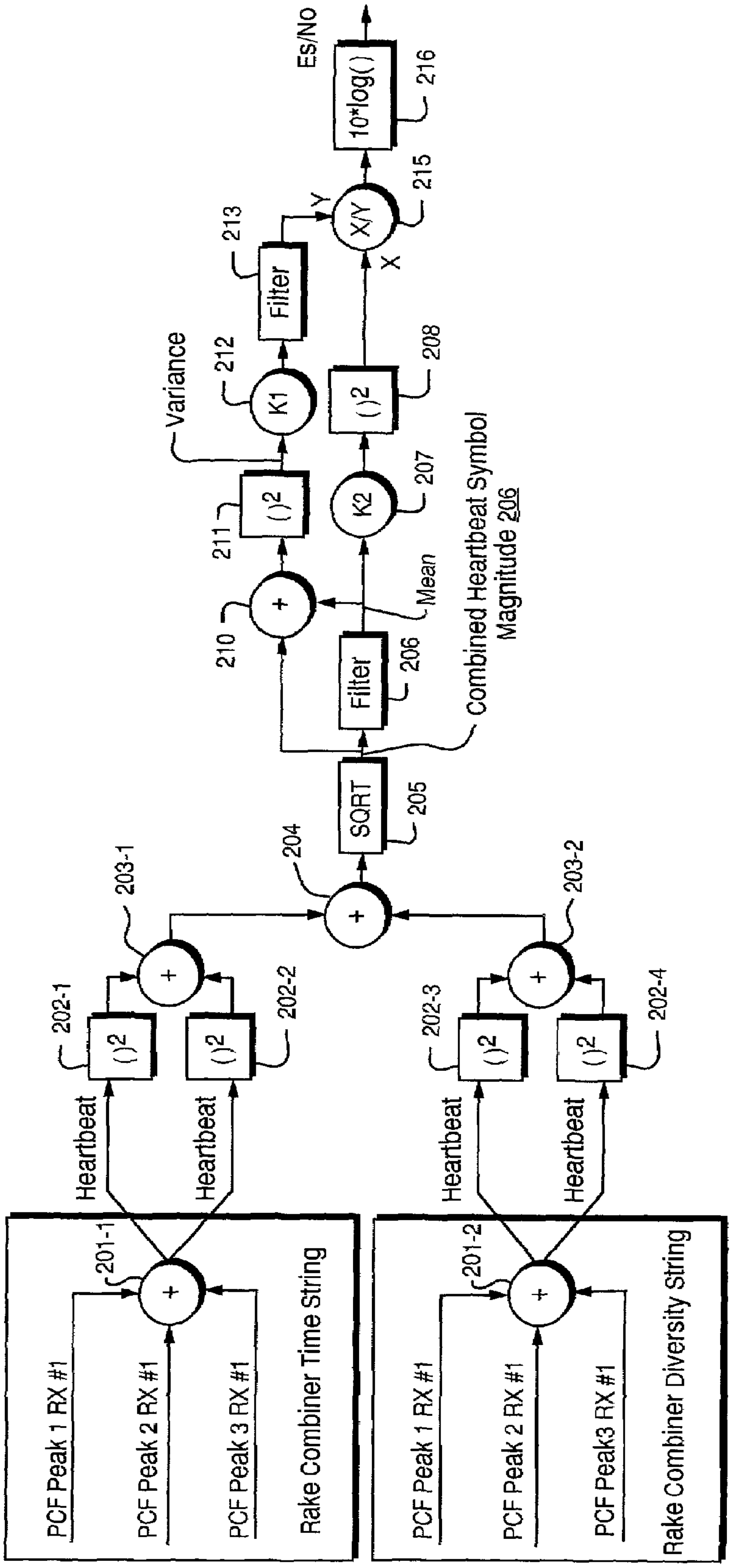
FIG. 7 illustrates a heartbeat channel Es/No calculation.

The Es/Nt calculation is shown graphically in FIG. 7. The complex values of the heartbeat demodulator from each rake finger are coherently combine 200, 201 and then the I and Q components are squared 202, added 203, 204 and the square root taken 205. This calculation yields heartbeat magnitude. The heartbeat magnitude is then filtered to yield the mean magnitude 200. The mean is then subtracted from the magnitude, squared and then filtered to yield a variance. The mean may be determined by a filter 206; the variance by subtractor 210 and squarer 211. The mean is then scaled by K2 (0.5) and squared to yield the heartbeat power. The variance is then scaled by K1 (0.5) 212 and filtered 213 to yield a noise estimate Nt. The scale factors are required because of the way the heartbeat channel is de-spread by the demodulator. The ratio of the power to Nt is computed by 208 and the log computed by 216. The value of Es/Nt is passed to the reverse capacity management algorithm once each heartbeat. The reverse capacity management algorithm provides the final averaging or filtering of the measurement prior to use. The measurement should preferably be made on a coherently combined results of the time alignment string.

5. Reverse Channel Management

The following sections outline the management of the reverse channels for each revision of the algorithm. In general, three types of traffic channels must be managed; the access channel, the heartbeat channels and the traffic channels. The management of the access and heartbeat channels requires setting their desired powers. These settings are sent on the forward paging channels as a broadcast message for access and as user specific messages for heartbeat. The traffic channel management requires determination of code rate and tier for each user requesting to go active.

5.1 Access Channel Power Setting

This message contains a number in dB ranging from 0 to 63 which represents the desired RX power for the access channel at the base with the base receive antenna gain taken into account. The calculation of this value is as follows:

*RX*_Access_Pwr_Desired=int(abs (Access_Power−*RX*_Ant_Gain+Offset))

Where:

Access_Power is a number in dBm (i.e. −116 dBm) controlled by the base station and will vary by basestation and depend upon input from the reverse capacity management algorithms. This number may change every few seconds.

RX_Ant_Gain is a number in dBi (i.e. 17.5 dBi) it may vary by base station and/or by sector. This number will be determined at the time the base station is brought on line and remain fixed.

Offset is an offset in dB used to reduce the number of bits used to reflect usable dynamic range. This number will be empirically determined and set for all deployments. Use 80 dB for now.

The management of the access channel requires setting the value for RX_Access_Pwr_Desired transmitted periodically on the forward paging channels. The value of RX_Access_Pwr_Desired is dependent on the value of an Access_Power parameter which is the power actually measured by the base station. The value of Access_Power can be computed from the equations $$P_{Access} = I_{Access} + \left(\frac{E_s}{N_t}\right)_{Acccess} - 10 * \log 10(SF_{Access}) \qquad \text{Equation 3}$$

Access Channel power

Where:

$I_{Access}$ is the interference from other channels and the RF front end (dBm)

$$\left(\frac{E_s}{N_t}\right)_{Acccess}$$

is the required energy per symbol for the access channel (8 dB)

$SF_{Access}$ is the number of chips per symbol for the access channel (32)

$I_{Access}$ is the interference noise power in dBm from other channels and the noise generated by the base station front end.

The interference noise power is calculated as shown below.

$$I_{Access} = 10 * \log 10(10^{\frac{P_{Traffic}}{10}} + 10^{\frac{P_{Heartbeat}}{10}} + 10^{\frac{P_{Nf}}{10}}) \qquad \text{Equation 4}$$

Access Channel Interference

Where:

$$P_{Traffic} = I_{Traffic} + \left(\frac{E_s}{N_t}\right)_{Traffic} - 10 * \log 10(SF_{Traffic})$$

$$P_{Heartbeat} = I_{Heartbeat} + \left(\frac{E_s}{N_t}\right)_{Heartbeat} - 10 * \log 10(SF_{Heartbeat})$$

$$P_{N_f} = -174 + 10 * \log 10(N_{BW}) + N_f$$

$$I_{Traffic} = 10 * \log 10(10^{\frac{P_{Access}}{10}} + 10^{\frac{P_{Heartbeat}}{10}} + 10^{\frac{P_{Nf}}{10}})$$

$$I_{Heartbeat} = 10 * \log 10(10^{\frac{P_{Traffic}}{10}} + 10^{\frac{P_{Access}}{10}} + 10^{\frac{P_{Nf}}{10}})$$

$$N_{BW} = 1.17 * 10^6 \text{ Hz.}$$

$$N_f = 5 \text{ dB.}$$

From the above equations it can be seen that computation of the access channel power is dependent on the traffic and heartbeat channel power which are intern dependent on the access channel power. If the desired $$\left(\frac{E_s}{N_t}\right)_{Access,Traffic,Heartbeat}$$

are all known, the set of equations can be reduced to three equations in three unknowns, if the noise figure of the radio is known. This solution will result in an explicit equation for the access power, heartbeat power and traffic power. As more traffic channels are added the number of equations and number of unknowns increase accordingly and the explicit equation for each channel becomes more unwieldy. Another method for solving the above set of equations is to solve them recursively. In this method the interference powers for each channel is initially assumed to be only the noise figure of the radio. The power for each channel is then calculated. A new value for the interference power is then calculated based on the new powers for each channel and the power for each channel is then calculated. This process is repeated until the power calculated for each channel is close (<0.1 dB) between two iterations and the process is stopped. If the recursion does not converge then the selected $$\left(\frac{E_s}{N_t}\right)_{Access,Traffic,Heartbeat}$$

are too high and cannot be supported simultaneously.

5.2 Traffic Channel Data Rate Determination

Figure 8:
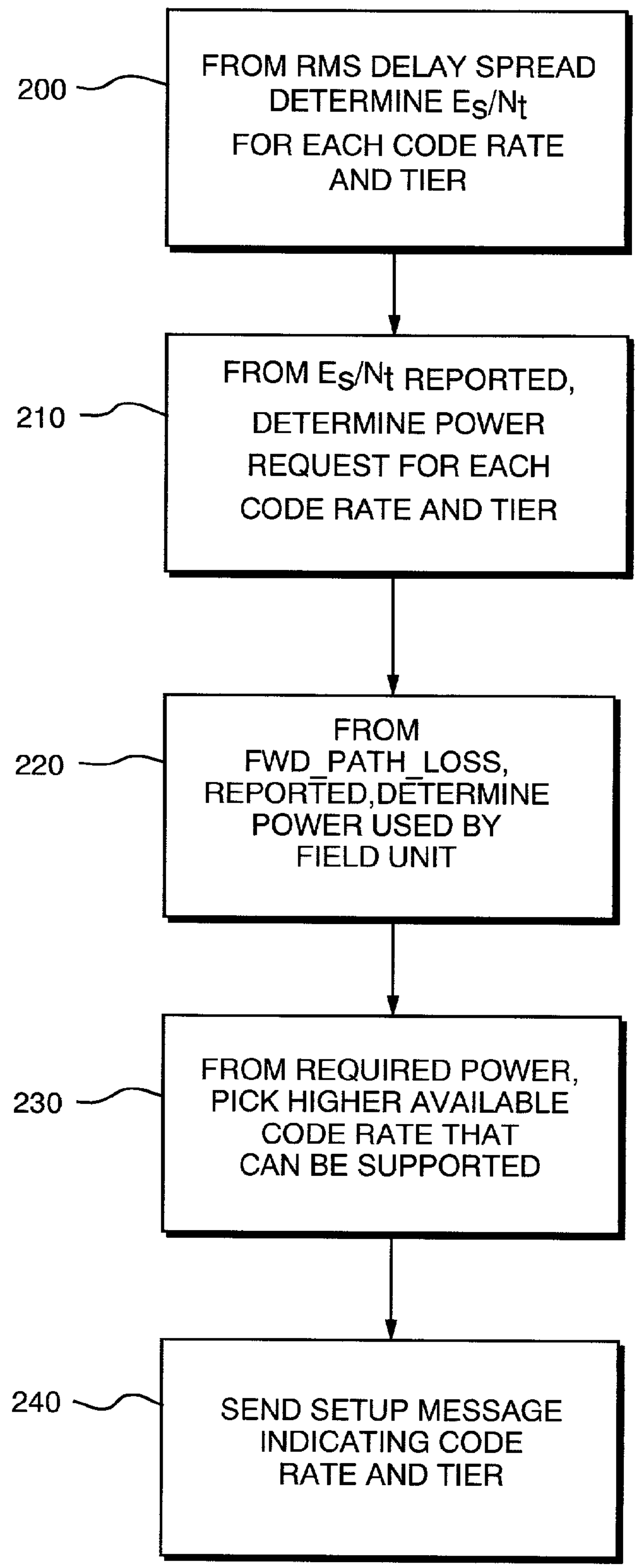
FIG. 8 is a flow chart for how the available data rates are selected.

The determination of the code rate and tier for the reverse link traffic channels 52 is dynamically determined by the processor 21, based on the received channel conditions at the base station. This determination is performed through the following steps, as also shown on the flow chart of FIG. 8.

Step 200. Based on the measured RMS delay spread from the heartbeat channel for the user determine the required Es/Nt for each possible code rate and tier.

Each of these steps is described in more detail below.

5.3.1 Determination of Required Es/Nt (Step 200)

The RMS delay spread for the heartbeat is used to index into a table to determine an Es/Nt for each code rate tier combination, and for each possible delay spread. The table values may be generated in a laboratory environment using a multi-path simulator with RMS delay spreads of between 0.2 and 4 us with a 5 Hz Doppler every 0.2 us. The tables are generated such that the set points deliver 1e-6 average Bit Error Rate (BER).

A possible table format is shown below in Table 1. This table is for a system having nine (9) possible code rate and tier values. In this situation, three different FEC code rates (⅓, ½ and ⅘) are available, and 3 possible tiers are provided by three different QAM modulation types. The path profiles used for this table is an exponentially weighted power profile using 6 possible delay spreads in the above RMS delay spreads. Indexing of the table will result in 9 numbers for each possible delay:

$$\left(\frac{E_s}{N_t}\right)^{T1}_{1/3}, \left(\frac{E_s}{N_t}\right)^{T1}_{1/2}, \left(\frac{E_s}{N_t}\right)^{T1}_{4/5}, \left(\frac{E_s}{N_t}\right)^{T2}_{1/3},$$

$$\left(\frac{E_s}{N_t}\right)^{T2}_{1/2}, \left(\frac{E_s}{N_t}\right)^{T2}_{4/5}, \left(\frac{E_s}{N_t}\right)^{T3}_{1/3}, \left(\frac{E_s}{N_t}\right)^{T3}_{1/2}, \left(\frac{E_s}{N_t}\right)^{T3}_{4/5}$$

and the table therefore has 6×9 or 54 entries.

TABLE 1

Es/Nt Table

| | $\left(\frac{E_s}{N_t}\right)^{T1}$ for Tier 1 | | | $\left(\frac{E_s}{N_t}\right)^{T2}$ for Tier 2 | | | $\left(\frac{E_s}{N_t}\right)^{T3}$ for Tier 3 | | |
|---|---|---|---|---|---|---|---|---|---|
| RMS Delay Spread (us) | ⅓ | ½ | ⅘ | ⅓ | ½ | ⅘ | ⅓ | ½ | ⅘ |
| 0.2 | | | | | | | | | |
| 0.4 | | | | | | | | | |
| 0.6 | | | | | | | | | |
| 0.8 | | | | | | | | | |
| 1.0 | | | | | | | | | |
| 1.2 | | | | | | | | | |
| 1.4 | | | | | | | | | |
| 1.6 | | | | | | | | | |
| 1.8 | | | | | | | | | |
| 2.0 | | | | | | | | | |
| 2.2 | | | | | | | | | |
| 2.4 | | | | | | | | | |
| 2.6 | | | | | | | | | |
| 2.8 | | | | | | | | | |
| 3.0 | | | | | | | | | |
| 3.2 | | | | | | | | | |
| 3.4 | | | | | | | | | |
| 3.6 | | | | | | | | | |
| 3.8 | | | | | | | | | |
| 4.0 | | | | | | | | | |

Step 210. Based on the Es/Nt reported by the heartbeat channel determine the power required for each of the code rate and tier combinations.

Step 220. Based on the forward path loss reported from the field unit determine the power required in the field unit.

Step 230. Given the field unit required power, pick the highest bit rate based on the tier and code rate supportable with some margin.

Step 240. Send the power level, code rate, and tier in a reverse link setup message.

5.3.2 Determination of Power Requirements (Step 210)

Based on the nine possible Es/Nt values as determined from the measured RMS delay spread, the power required at the field unit 14 must then be calculated. The Es/Nt measurement made on the heartbeat channel and the measured heartbeat power can be used to compute Nt. Once Nt is known, then given each required Es/Nt, the required received power at the base station can be computed. These calculations are outlined below.

$$N = Pwr_{Heartbeat} - \left(\frac{E_s}{N_t}\right)_{Heartbeat} + 10\log(256) \qquad \text{Equation 5}$$

Heartbeat Noise Calculation

Where:

$PWr_{Heartbeat}$ is the measured heartbeat power as outlined above (RX_HrtBt_Pwr_Measured).

$$\left(\frac{E_s}{N_t}\right)_{Heartbeat}$$

is the measured energy per symbol to noise density in the heartbeat channel, as explained above.

10log(256) is a bandwidth reduction factor due to PN spreading.

The value of N computed above will vary depending on whether or not there is a user active with reverse channels or an access message was present while the measurements are made. Assuming some orthogonality gain between the traffic and heartbeat channels due to time alignment the contribution to N from the traffic channel if present will be small and would not effect the value of N greatly. If the access channel is lightly loaded then the access channel may effect the value of N. For this revision of the algorithm enough margin must be included in the set up calculations to handle access channel messaging.

To compute the required power at the base station receiver the noise calculated in Equation 5 is used with each of the nine possible Es/Nt as follows:

$$C^{T1,T2,T3}_{\frac{1}{3},\frac{1}{2},\frac{4}{5}} = N + \left(\frac{E_s}{N_t}\right)^{T1,T2,T3}_{\frac{1}{3},\frac{1}{2},\frac{4}{5}} - 10\log(SF_{T1,T2,T3}) \qquad \text{Equation 6}$$

Receive Power Requirement

Where: $SF_{T1}=8$, $SF_{T2}=32$, $SF_{T3}=256$.

The above calculation results in nine different receive power requirements for each tier and code rate combination. These nine power requirements are:

$C_{1/3}^{T1}$, $C_{1/2}^{T1}$, $C_{4/5}^{T1}$, $C_{1/3}^{T2}$, $C_{1/2}^{T2}$, $C_{4/5}^{T2}$, $C_{1/3}^{T3}$, $C_{1/2}^{T3}$, $C_{4/5}^{T3}$ 5.3.3. Required Field Unit Power (Step 220)

In order to determine which of the nine power requirements can be met, the required transmit power at the field unit must next be determined. Two values are reported to the base station to allow this calculation; the forward path loss and the field unit PA power used when the bandwidth request message 100 was sent on the access channel. To compute the power available at the base station 20 the following general equation is used:

P=Field_PA_Power+Field_TX_Ant_Gain−Fwd_Path_Loss+Base_RX_Ant_Gain Equation 7 Base Station Reverse Link Power Where:

Field_PA_Power is the power set point on the field unit power amplifier.

Field_TX_Ant_Gain is a number in dB (i.e. 6 dB) which represents the gain of the field unit's transmit antenna. This number will most likely be a constant but may vary by field unit configuration. Use 6 dB for now.

Fwd_Path_Loss is the path loss in dB between the base station and field unit. This number is actually calculated by the field unit and contains losses due to log normal fading and shadowing which are considered to be reciprocal between the forward and reverse links.

Base_RX_Ant_Gain is a number in dBi (i.e. 17.5 dBi) indicating base station antenna gain. It may vary by base station and/or by sector. This number will be determined at the time the base station is brought on line and remains fixed from that point.

Determining the required transmit power at the field unit requires a solution to Equation 7 for each possible code rate and tier. The computation is done in two ways by the base station 20. The first solution is use the forward path loss reported by the field unit and assume values for the field transmit antenna gain and base receive antenna gain. Given these two assumptions, Equation 7 can be manipulated to give Equation 8 below.

$$\text{Field\_PA\_Power}^{T1,T2,T3}_{\frac{1}{3},\frac{1}{2},\frac{4}{5}} = C^{T1,T2,T3}_{\frac{1}{3},\frac{1}{2},\frac{4}{5}} - \text{Field\_TX\_Ant\_Gain} + \text{Fwd\_Path\_Loss} - \text{Base\_RX\_Ant\_Gain} \qquad \text{Equation 8}$$

Estimated Field Transmit Power

Where $$C^{T1,T2,T3}_{\frac{1}{3},\frac{1}{2},\frac{4}{5}}$$

is the received power requirement at the base station for each code rate and tier combination. The above calculation yields nine (9) possible field unit power settings.

The other solution to Equation 7 is to use the PA setting reported in the bandwidth request message on the reverse link to determine the sum of the field transmit antenna gain, forward path loss, and base receive antenna gain. This calculation is shown below in Equation 9.

$P_{Measured}=PA_{TX}$+Field_TX_Ant_Gain−Fwd_Path_Loss+Base_RX_Ant_Gain Equation 9

Where:

$P_{Measured}$ is the measured receive power on the access channel when the bandwidth request message was received.

$PA_{TX}$ is the field unit transmit power when the bandwidth request message was sent from the field unit.

Equation 9 can be manipulated to yield the components of Equation 7 which are not known and then substituted into Equation 8 to yield Equation 10.

$P_{Measured}-PA_{TX}$=Field_TX_Ant_Gain−Fwd_Path_Loss+Base_RX_Ant_Gain $$\text{Field\_PA\_Power}^{T1,T2,T3}_{\frac{1}{3},\frac{1}{2},\frac{4}{5}} = C^{T1,T2,T3}_{\frac{1}{3},\frac{1}{2},\frac{4}{5}} - P_{Measured} + PA_{TX} \qquad \text{Equation 10}$$

Estimated Field Transmit Power

The above calculation also yields nine (9) possible field unit power settings.

Both calculations are subject to error. In the first solution the field transmit antenna gain and base receive antenna gains are not precisely known. However, if the field transmit antenna is reciprocal with the receive gain (or nearly so) and the base receive antenna gain is reciprocal with the transmit antenna gain then most of the error falls out (because of the way forward path loss is calculated and the power set points for the traffic sent the in the reverse link setup message). In the second solution the antenna gains are lumped with the path loss and are not a factor. However, the accuracy of the measurement of the access channel power is degraded due to the possibility of collisions occurring on the channel, which introduces error. Making an error in computing the necessary power at the field unit means the channel is configured at too high a tier/code rate and an acceptable FER cannot be supported because the field unit is in a power limit condition, or possibly the field unit is operating at a tier/code rate below that which it is capable of.

The above two solutions yield 18 possible field PA power requirements, two for each tier/code rate combination. In order to prevent the case of too high a tier/code rate from being selected, the highest field PA power setting for each tier/code rate is selected from the two methods. Due to the nature of the calculation all nine settings will come from either one solution method or the other.

5.3.4 Tier/Code Rate/Power Selection (Step 230)

Given the nine possible field PA settings calculated above, the tier/code rate/and receive power at the base station must then be selected. Each of the of the possible field PA settings is compared to the maximum field PA power to determine which are within the capability of the field unit. The maximum field PA power is currently +26 dBm. Ultimately this may vary by field unit and would be reported in the protocol revision etc sent in the initial connection to the base station or stored with user data at the WIF. Any field power requirement above (+26 dBm−Link Margin) should be discarded since it is beyond the capability of the field unit. Link Margin is some number of dBs used to compensate for Raleigh fading, errors in the above calculations, and access messaging. For this revision of the algorithm Link Margin can be programmable and initially set to 3 dB.

Of the remaining tier code rate combinations the combination yielding the highest bit rate should be selected. One possible bit rate for each tier and code rate with a 6% pilot symbol insertion factor is shown in Table 2:

TABLE 2

| | Nine Possible Reverse Bit Rates (kb/s) | | |
|---|---|---|---|
| | Code Rate | | |
| Tier | ⅓ | ½ | ⅘ |
| 1 | 80.6 | 132.9 | 224.5 |
| 2 | 20.2 | 33.2 | 56.1 |
| 3 | 5.0 | 8.3 | 14.0 |

With the highest bit rate selected from the above table, the tier and code rate are then known. Given the tier and code rate combination, the received power at the base station is now also known based on the results of Equation 6. This value is Traffic_Pwr above.

5.3.5 Reverse Traffic Channel Allocation Message (Step 240)

This message is formulated including information as to selected tier and code rate and forwarded to the field unit 14 so that it may properly set its power level.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining data rate for a communications channel comprising the steps of:

sending a first message from a first station to a second station, the message indicating an Effective Radiated Power (ERP) data value of signals transmitted by the first station;

receiving the first message at a second station;

measuring a signal strength for signal received at the second station;

computing a path loss estimate at the second station as the difference between the ERP data value that it received and the measured signal strength;

measuring the transmit power level for signals transmitted by the second station;

sending a one or more messages from the second station to the first station, the message indicating transmit power level information and the forward path loss information;

receiving the transmit power level information and the forward path loss information at the first station, and calculating an amount of excess power available at the second station; and determining an acceptable data coding rate for transmission between the first station and the second station from the excess power available.

2. A method as in claim 1 wherein determining an acceptable data coding rate includes selecting from among multiple available Forward Error Correction (FEC) coding rates.

3. A method as in claim 1 wherein determining an acceptable data coding rate includes selecting from among available modulation rates.

4. A method as in claim 1 wherein the first station is a base station and the second station is a field unit.

5. A method as in claim 4 wherein the first message is sent on a paging channel.

6. A wireless communication system in which digital signals are communicated comprising:

a first station for:

(i) sending a first message to a second station, the message indicating an Effective Radiated Power (ERP) data value of signals transmitted by the first station;

(ii) receiving a transmit power level information and a forward path loss information from a second station, and calculating an amount of excess power available at the second station; and (ii) determining an acceptable data coding rate for transmission between the first station and the second station from the excess power available; and a second station for:

(i) receiving the first message and measuring a signal strength for received signal;

(ii) computing a path loss estimate at the second station as the difference between the ERP data value that it received and the measured signal strength;

(iii) measuring the transmit power level for signals transmitted by the second station;

(iv) sending a one or more messages to the first station, the message indicating transmit power level information and the forward path loss information.

7. A wireless communication system as in claim 6 wherein determining an acceptable data coding rate includes selecting from among multiple available Forward Error Correction (FEC) coding rates.

8. A wireless communication system as in claim 6 wherein determining an acceptable data coding rate includes selecting from among available modulation rates.

9. A wireless communication system as in claim 6 wherein the first station is a base station and the second station is a field unit.

10. A wireless communication system as in claim 9 wherein the first message is sent on a paging channel.

* * * * *